(12) United States Patent
Thomas et al.

(10) Patent No.: US 6,219,046 B1
(45) Date of Patent: Apr. 17, 2001

(54) MAN-MACHINE INTERFACE FOR A VIRTUAL ANNUNCIATOR PANEL DISPLAY

(75) Inventors: Robert P. Thomas, Ellington; James V. Petrizzi, Tarriffville, both of CT (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 09/156,203

(22) Filed: Sep. 17, 1998

(51) Int. Cl.[7] .............................. G06F 3/00; G06F 19/00
(52) U.S. Cl. .................... 345/336; 345/348; 345/333; 345/338; 345/965; 345/970; 700/286; 700/292; 700/293; 700/83
(58) Field of Search .................................. 345/354, 348, 345/333, 335, 970, 967, 965, 355, 336, 338; 700/83, 286, 292, 293, 296

(56) References Cited

U.S. PATENT DOCUMENTS

| | | | | |
|---|---|---|---|---|
| 5,295,062 | * | 3/1994 | Fukushima | 700/83 |
| 5,452,415 | * | 9/1995 | Hotka | 345/329 |
| 5,751,965 | * | 5/1998 | Mayo et al. | 345/329 |
| 5,768,119 | * | 6/1998 | Havekost et al. | 700/4 |
| 5,859,885 | * | 1/1999 | Rusnica et al. | 376/259 |
| 5,896,138 | * | 4/1999 | Riley | 345/440 |
| 6,031,535 | * | 2/2000 | Barton | 345/354 |
| 6,040,834 | * | 3/2000 | Jain et al. | 345/356 |

* cited by examiner

Primary Examiner—Raymond J. Bayerl
Assistant Examiner—Cuong T. Thai
(74) Attorney, Agent, or Firm—Cantor Colburn LLP; Carl B. Horton

(57) ABSTRACT

A power management control system provides control and graphical representation of a plurality of electrical devices and components of an electrical distribution system. The control system includes a virtual three-dimensional annunciator panel for displaying an indication of the status or condition of a plurality a plurality of electrical devices of an electrical distribution system. The virtual annunciator panel includes an array (6×8) of indicator buttons that represent a particular device, event or group of events of the PMCS. The buttons are displayed in different colors to indicate different alarm systems. The annunciator panel functions to notify the user/operator of an alarm condition of a device, as well as permits the user to acknowledge alarms. The development of the virtual annunciator panel display is automated using software, namely an Annunciator Panel Wizard. The Panel Wizard provides the automated configuration of the annunciator panel graphic as well as a built-in event mapping to the annunciator buttons which is user configurable. The Panel Wizard allows the user to generate the virtual annunciator panel display without any programming skills or detailed device knowledge.

15 Claims, 15 Drawing Sheets

FIG. 9

MAN-MACHINE INTERFACE FOR A VIRTUAL ANNUNCIATOR PANEL DISPLAY

BACKGROUND OF THE INVENTION

The present invention relates generally to a power management control system and in particular, to software that implements and automates the development of a virtual 3-D annunciator panel display including built-in event mapping to the annunciator tiles.

Power management control systems monitor and control a variety of intelligent electronic devices of an electrical distribution system. These control systems, generally, include an annunciator panel or board provided at a console of the operator or user. The annunciator panel includes an array of buttons that provide status information of selected devices of the distribution system. Each button is indicative of the status of a corresponding device of the distribution system. Each of the buttons illuminates with different colors, wherein each color is representative of the status of the selected device. For example, a green button may represent that the corresponding device is operating properly, and a red light may indicate that a fault condition exists. The panel provides an easy method of visually monitoring the condition or status of the electrical system. If a fault occurs that requires acknowledgement by the operator of the system before resetting the fault, the operator may attempt to reset the failure by depressing the button to acknowledge the fault.

Some power management control systems include a computer connected to a common bus that allows communication between the intelligent monitoring/control devices and a server. The control system provides graphical representations of and links to the devices of the distribution system to enable a user to monitor and operate the distribution system.

For these computer control management systems, there is a need for an equivalent virtual annunciator panel display that provides the same function of the annunciator panel described hereinbefore. Some power management control systems do offer a virtual three-dimensional annunciator panel displays; however, the system is not easily configurable without having programming knowledge and capability as well as intimate knowledge of each of the devices of the distribution system.

Current virtual annunciator panel displays also include an array of buttons or tiles that provide the status of selected intelligent devices of the distribution system. In order to functionally link buttons of the virtual annunciator panel to the selected devices, each virtual annunciator panel requires custom programming by a knowledgeable integrator.

BRIEF SUMMARY OF THE INVENTION

This invention offers advantages and alternatives over the prior art by providing an Annunciator Panel Wizard for a power management control system that automates the development of a virtual annunciator panel display. The Panel Wizard provides the automated configuration of the annunciator panel graphic as well as a built-in event mapping to the annunciator buttons, which is user configurable. The Panel Wizard provides a rapid and cost effective method by which to develop a virtual annunciator panel display. The Panel Wizard allows the user to generate the virtual annunciator panel display without any programming skills or detailed device knowledge.

In accordance with a present invention, a method is provided for generating an annunciator panel display having at least one indicator for monitoring a device of a power control system. The method includes selecting an annunciator panel wizard and selecting an indicator of the annunciator panel. An event logger is provided for monitoring events of a device of the power control system. A navigational link is provided between the selected indicator and the event logger. A visual display is assigned to the selected indicator that is indicative of the occurrence of the monitored event.

BRIEF DESCRIPTION OF THE DRAWINGS

Referring now to the drawings wherein like elements are numbered alike in the several FIGURES:

FIG. 9 is a view of an Touch—windowviewer window generated by the computer software of FIG. 3;

DETAILED DESCRIPTION OF THE INVENTION

Figure 1:
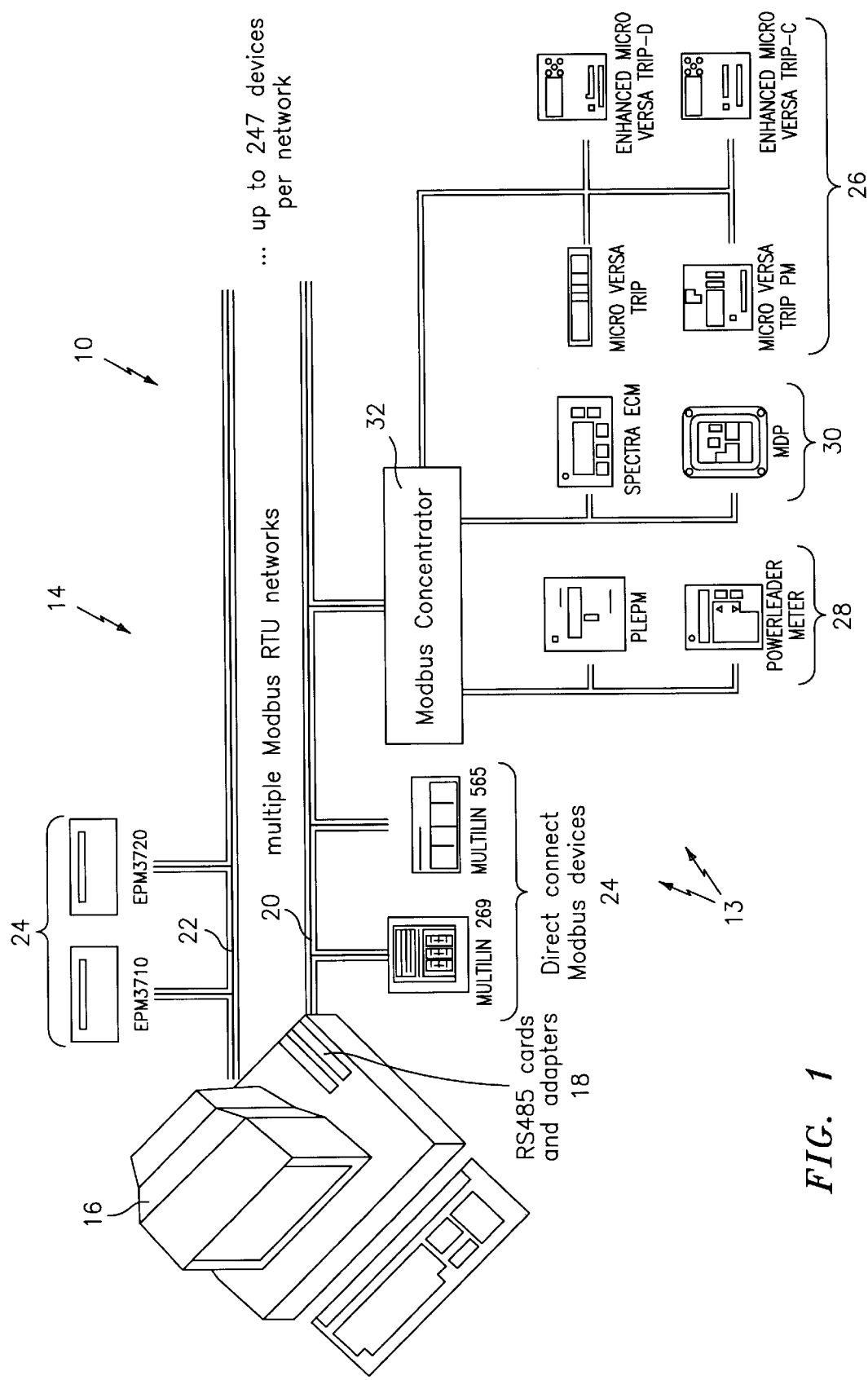
FIG. 1 is a diagrammatic block diagram of a power management and control system in accordance with the present invention.

Referring now to FIG. 1, a power management control system ("PMCS"), generally designated 10, provides a three-dimensional ("3-D") virtual annunciator panel 12 (see FIG. 2) for displaying a visual indication of the status or condition of a plurality of electrical devices and components 13 of an electrical distribution system 14. The PMCS 10 comprises a computer 16, e.g., an IBM-PC AT compatible machine which is based on a Pentium processor, having standard RS485 interface cards 18, or an RS232 to RS485 convertor, and adapters installed in its I/O slots. The computer 16 contains software for monitoring and controlling selected aspects of power usage/consumption, as described in more detail hereinafter. Cards 18 provide I/O ports that define multiple industry standard Modbus RTU networks 20 and 22. The Modbus RTU protocol is a well-known industry standard. Devices with a Modbus RTU interface can be connected directly to the Modbus, e.g., control devices 24, such as, Multilin models 269 and 565 and power management EPM 3710 and EPM 3720. Other devices communicate on the Commnet protocol and include trip units 26, e.g., Trip, Enhanced Trip-D, Trip PM and Enhanced Trip-C Units, which are commercially available from General Electric Co., meters 28, e.g., Power Leader Meters commercially available from General Electric Co., and relays 30, e.g., General Electric Co.'s Spectra ECM and Power Leader MDP. A Modbus concentrator 32 provides an interface between the Modbus RTU protocol and the Commnet protocol, whereby these devices can communicate through Modbus concentrator 32 over the Modbus. In this example, up to thirty-two devices (i.e., direct connect devices or Modbus concentrators) can be connected to each Modbus RTU network.

Figure 2:
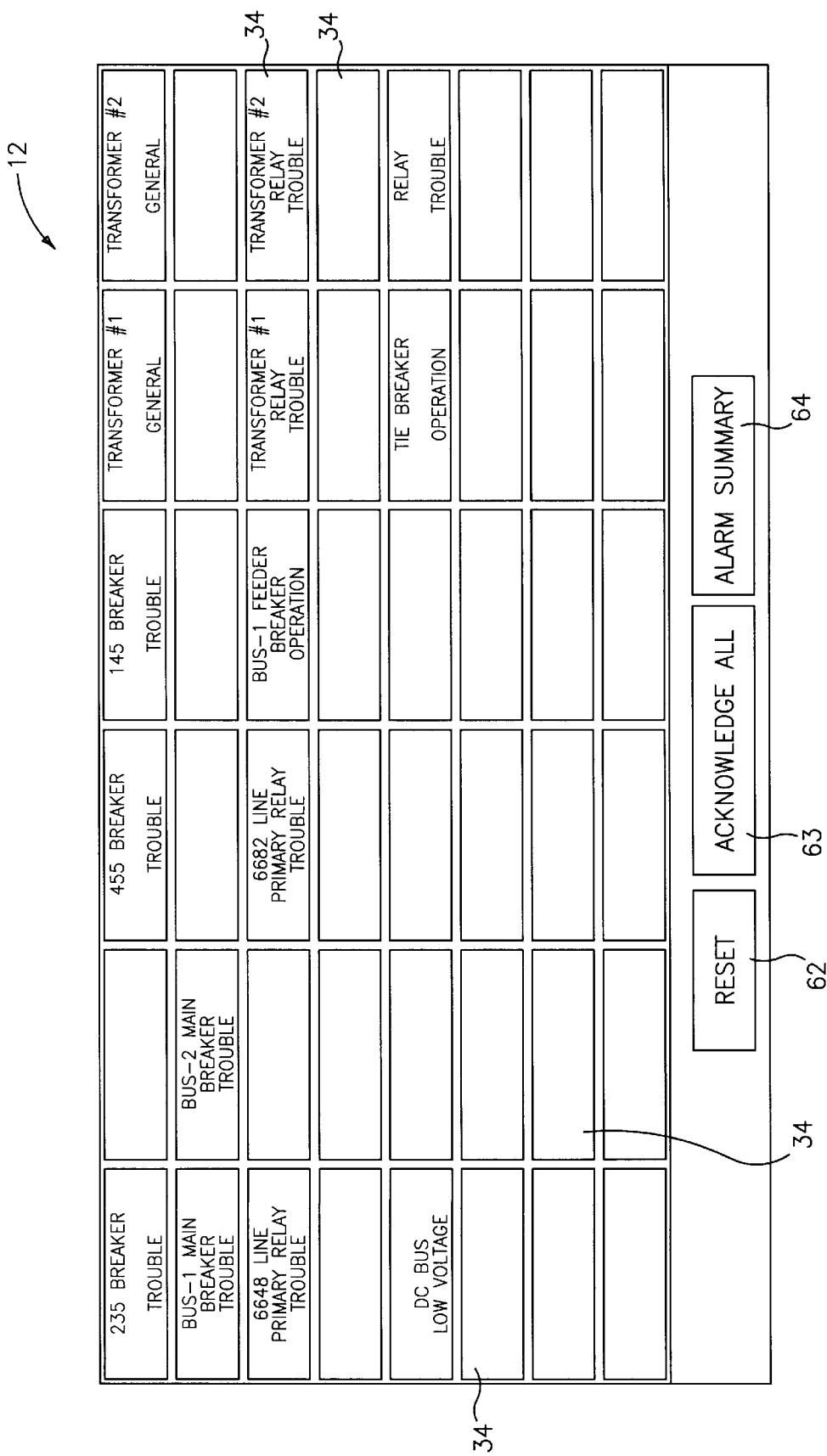
FIG. 2 is a view of a virtual annunciator panel display window generated by computer software embodying the present invention.

Referring to FIG. 2, the display of the virtual three-dimensional annunciator panel 12 includes an array (6×8) of indicator buttons or tiles 34 that represent a particular device, event or group of events of the PMCS 10. The buttons 34 are displayed in different colors to indicate different alarm systems. The annunciator panel 12 functions to notify the user/operator of an alarm condition of a device 13, as well as permits the user to acknowledge alarms, as will be described in greater detail hereinafter.

The development of a virtual 3-D annunciator panel display 12 is automated using software, namely an Annunciator Panel Wizard. The Panel Wizard provides the automated configuration of the annunciator panel graphic as well as a built-in event mapping to the annunciator buttons 34 which is user configurable. The Panel Wizard provides a rapid and cost effective method by which to develop a virtual annunciator panel display 12. Previous implementations of annunciator panel displays required custom programming by the integrator developing the system. The Panel Wizard allows the user to generate the virtual annunciator panel display 12 without any programming skills or detailed device knowledge. The invention closely couples the existing event processing in the PMCS 10 with annunciator displays 12 in the user interface, as will be described in greater detail hereinafter.

Figure 3:
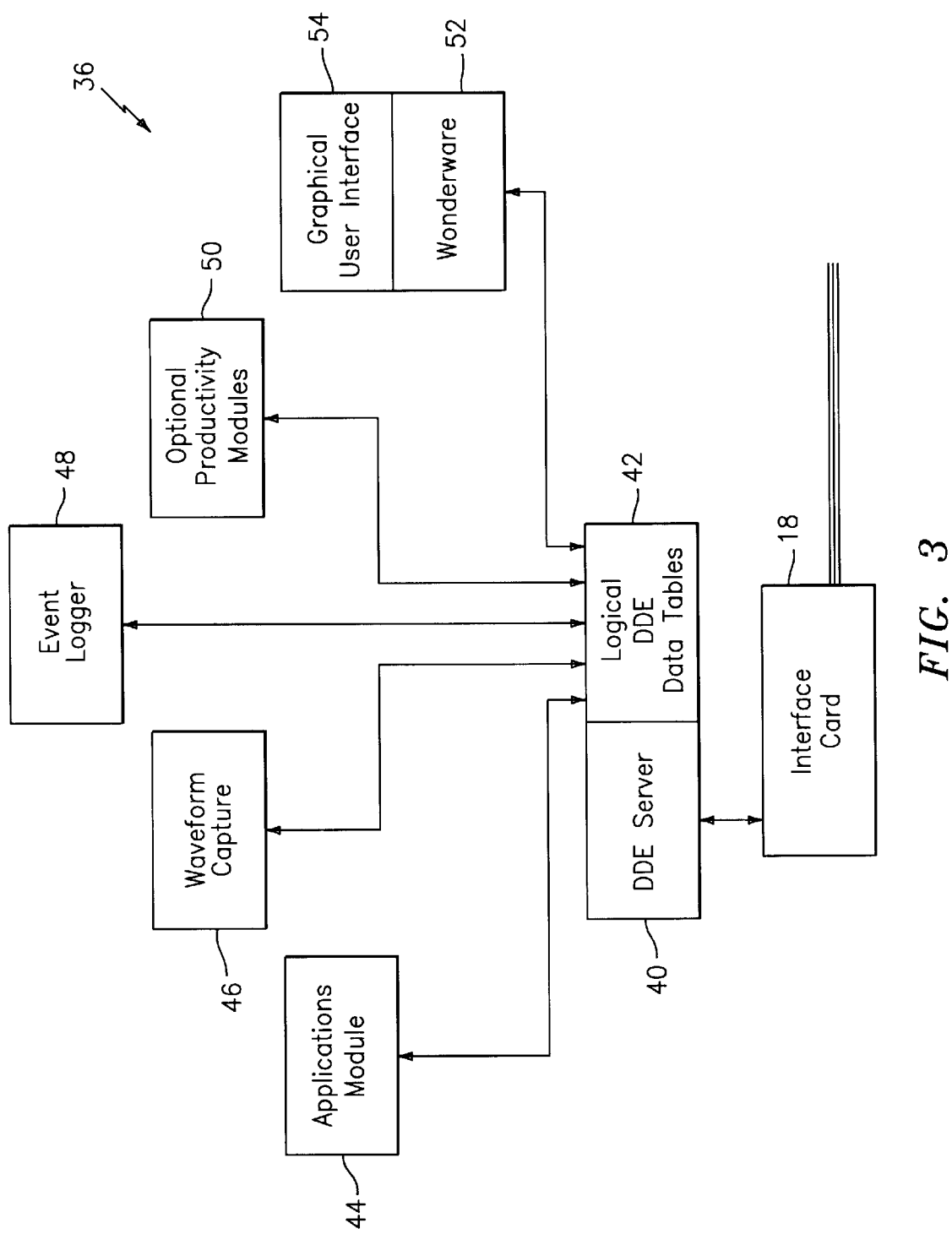
FIG. 3 is a block diagram of the computer software used in the power management and control system of the present invention.

Referring now to FIG. 3, a block diagram 36 of the software for monitoring and controlling selected aspects of power usage/consumption of the PMCS 10, discussed above, is generally shown. This software is loaded into the computer 16 and includes a dynamic data exchange (DDE) server 40. DDE server 40 allows external programs to access power management data in a Microsoft Windows environment. Data interface to DDE server 40 is provided by the system through a Wonderware InTouch utility. A configuration and control interface for the DDE server is provided through server application window menus. Associated with DDE server 40 are logical data tables 42 and related modules, i.e., an Excel or other DDE aware applications module 44, a waveform capture module 46, an event logger module 48, productivity modules 50, and a Wonderware InTouch module 52. Module 52 includes a tool kit for building screens and interfaces, and a graphical user interface 54 for monitoring and control of the electrical distribution system. The graphical user interface 54 for the server operates in 32 bit Windows or Windows NT environment and InTouch library functions. Waveform capture module 46 provides for viewing and analysis of waveforms (e.g., Fourier, frequency and/or harmonic analysis) captured by sophisticated metering devices. Event Logger module 48 provides for viewing, organizing and analyzing unusual behavior in a power system. Productivity modules 50 include, for example, a cost allocation module and a load management module. The cost allocation module provides for tracking power consumption to the sub-unit level, developing internal billing methods and reports, thereby reducing cost. The load management module provides for tracking power demand and automatically shedding non-critical loads to prevent peak demand penalties, and provides for timer-based control to reduce power consumption. DDE server 40 communicates though the interface card 18 shown in FIGS. 1 and 3.

The event logger module 48 includes a utility that passes a received message as an un-acknowledgeable or acknowledgeable alarm or as an event based upon the contents of an initialization file. The DDE server 40 ensures that all events are cast in the same format so that the event logger module 48 can interpret each event. Electrical meters 28 and control/protection devices 26 use various codes to describe occurrences to the circuits that are monitored or controlled. A file collates these codes into three categories for analysis. These three categories for any particular device are modifiable for the code received from a device. The three categories are 'ACK/UNACK' for acknowledgeable alarms, '−' for alarms requiring no acknowledgment, and "EVENTS" for merely reporting the device status.

The waveform capture module 46 includes a utility that provides an interface to configure and display data from a device that transmits waveform data. These devices transmit waveform data with different formats. One uniform display format is desired for these different types of meters. This utility applies header information transmitted by the meter to correctly scale and display the comma separated value data transmitted by the devices as applicable.

Figure 4:
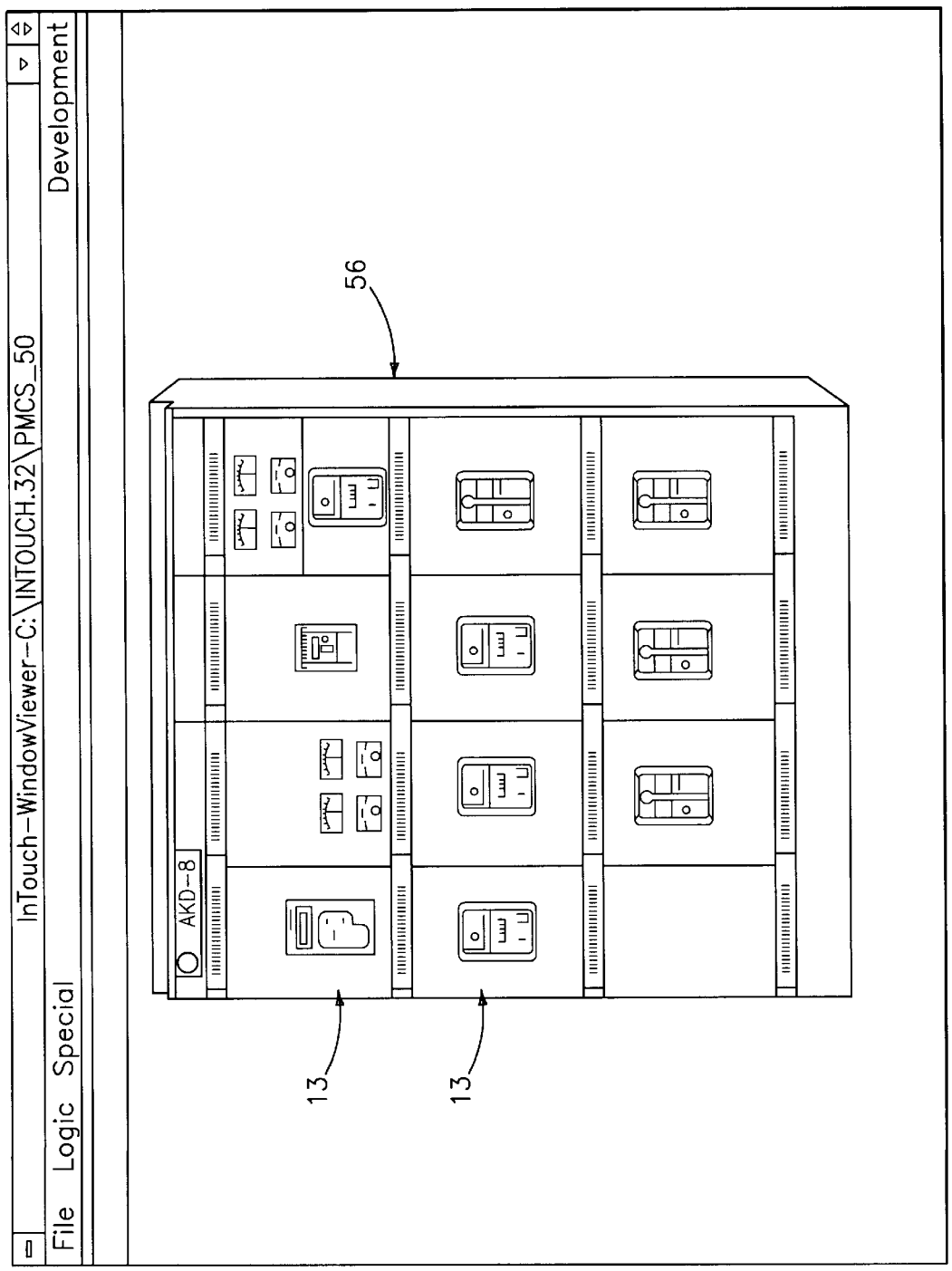
FIG. 4 is view of an InTouch—windowviewer window generated by the computer software of FIG. 3.
Figure 5:
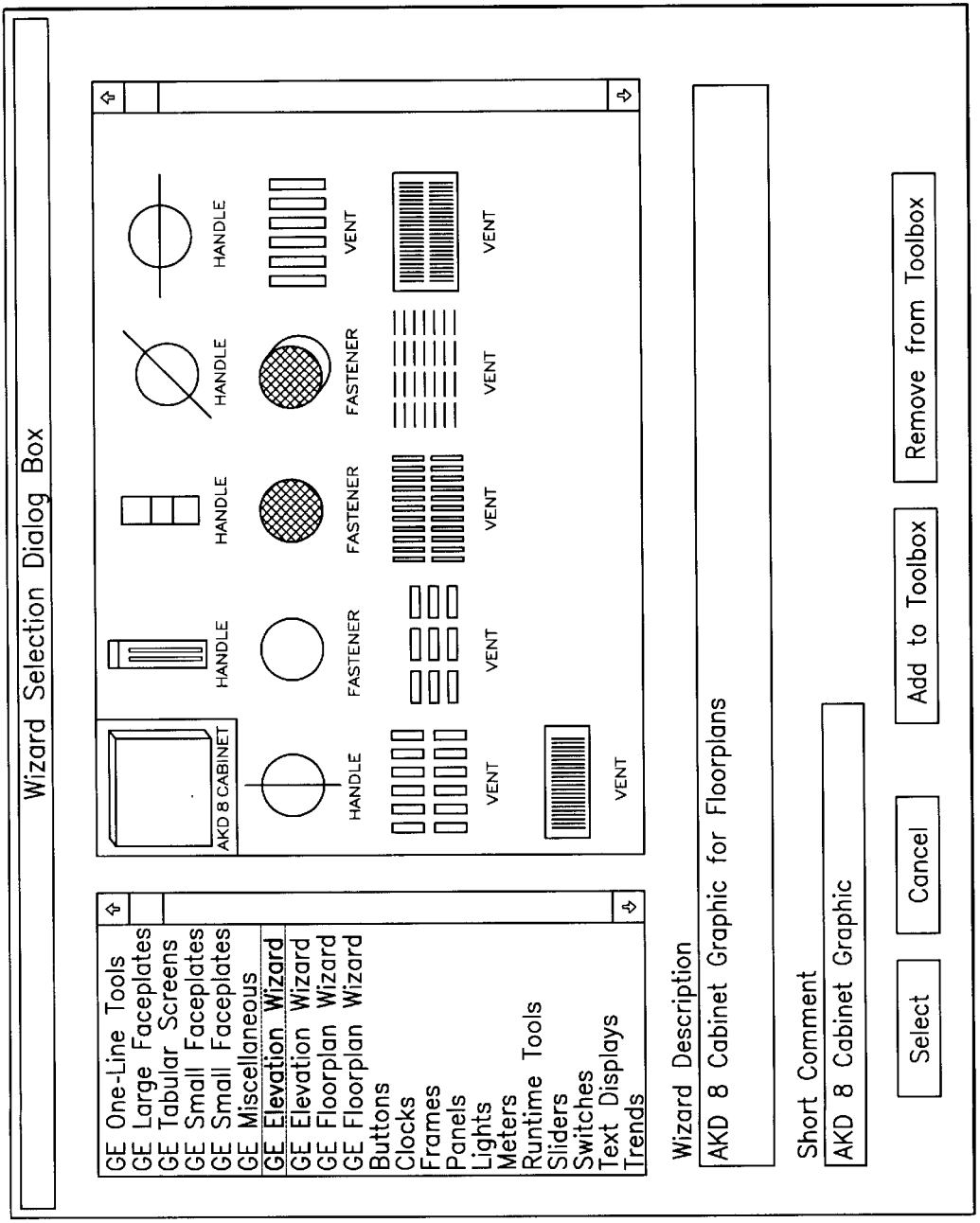
FIGS. 5–8 are views of wizard selection dialog box windows generated by the computer software of FIG. 3.
Figure 6:
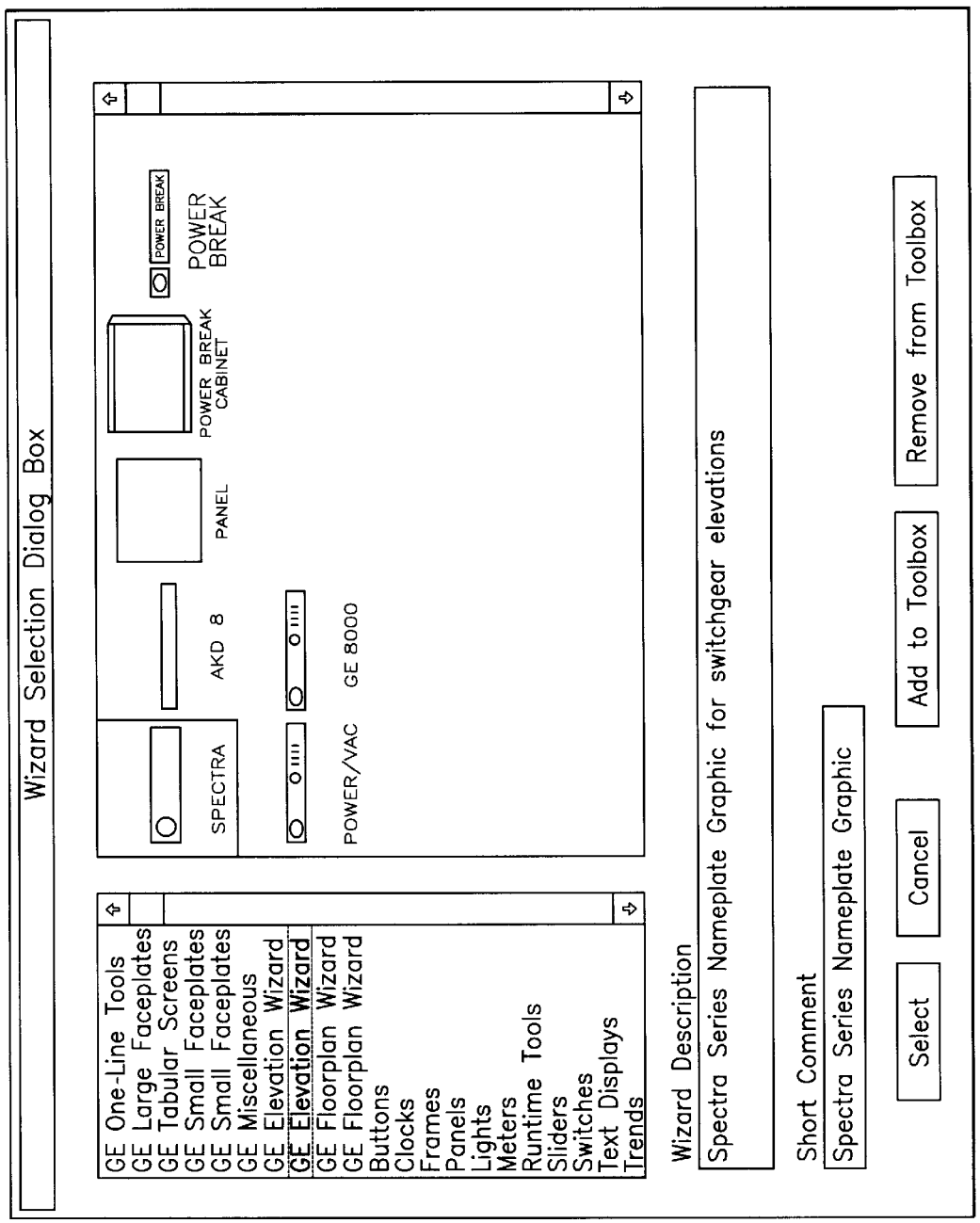
Figure 7:
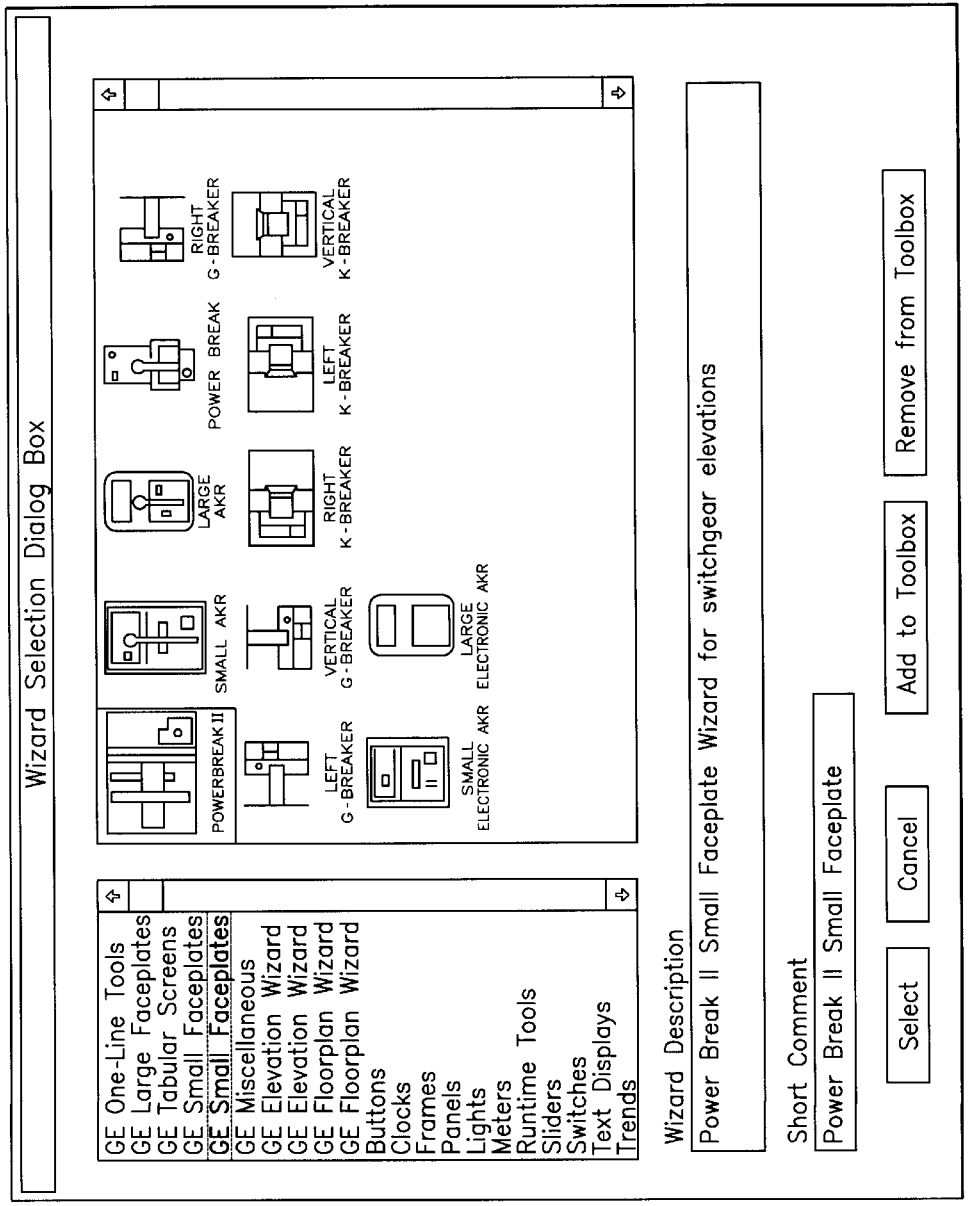
Figure 8:
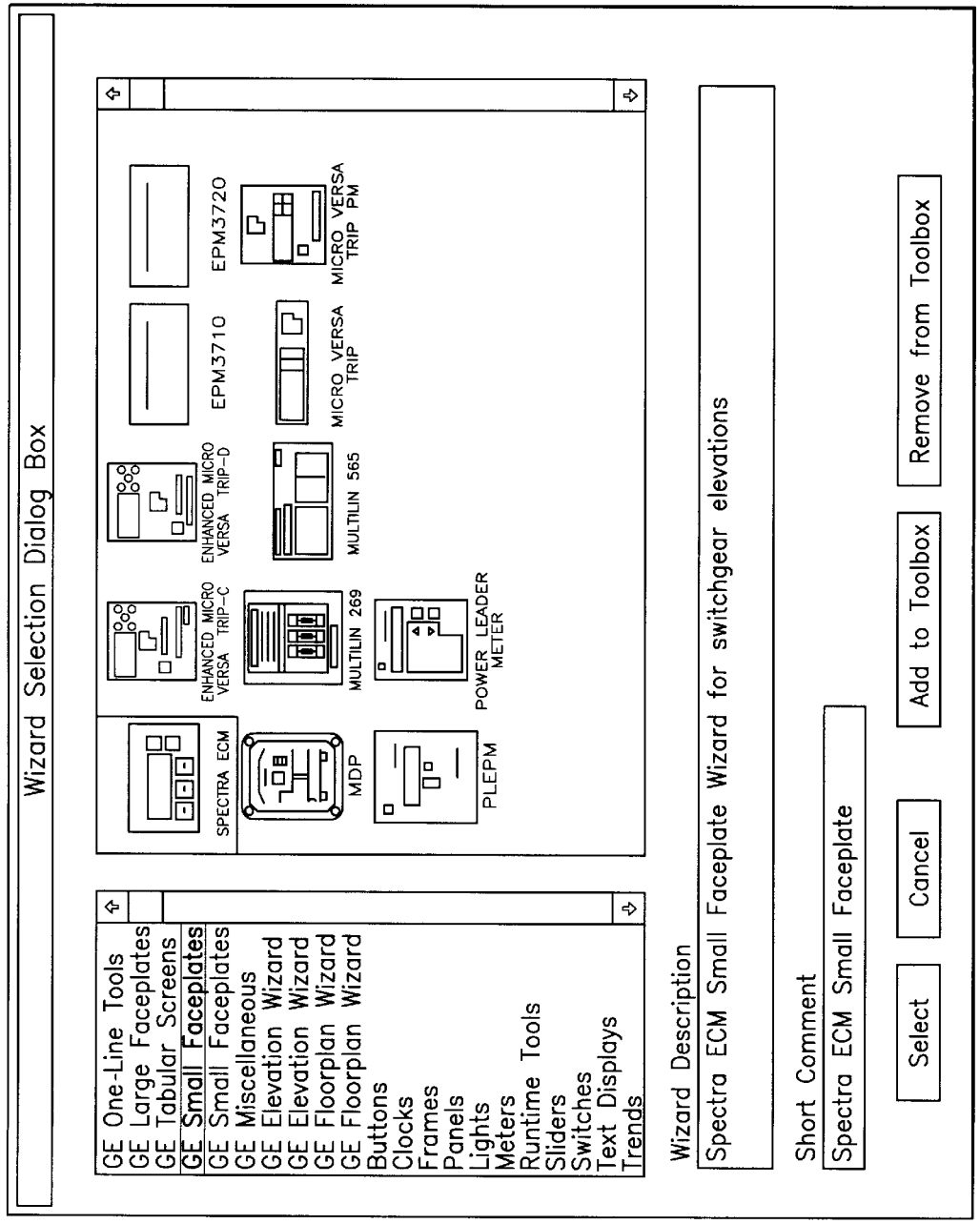

The Wonderware InTouch module 52 includes a software toolkit for rapid development of three-dimensional representations of electrical distribution switchgear 56, as shown in FIG. 4. These switchgear elevations have logical connections to the switchgear devices 13. Referring to FIG. 4, a typical switchgear elevation developed with the so-called Power Wizards illustrated in FIGS. 5–8 is shown. This elevation can be modified to any dimensions with an infinite number of combinations and arrangements of meters and protection devices to quickly and accurately represent a customer's switchgear. The Power Wizards eliminate the necessity to draw each individual component line by line. The user starts by selecting a cabinet wizard such as the AKD-8 or Power Break Cabinet to which handles, panels, and fasteners are added, FIGS. 5 and 6. Thereafter, circuit breakers 26 (FIG. 7), meters 28 and other protection devices (FIG. 8) are located or dropped onto the appropriate panels in the same locations as the customer's actual switchgear. These items have dialog boxes associated with them that are opened by double clicking on one of the Power Wizards once they have been dropped. From this dialog box a navigational link is established to another window that contains another Power Wizard that displays detailed metering, configuration, and control information.

The Wonderware InTouch module 52 includes predefined tabular representations of metering and setup/set point information that is generated automatically, with the appropriate database server links established. A rapid method is provided to accurately generate a user interface for power distribution metering, protection, and control devices 13 with the capability to repeat this interface repeatedly for many devices of the same type while maintaining the capability to uniquely identify a device. The Power Wizards allows the user to generate a power distribution device interface without programming skills or detailed knowledge of the device.

Figure 9:
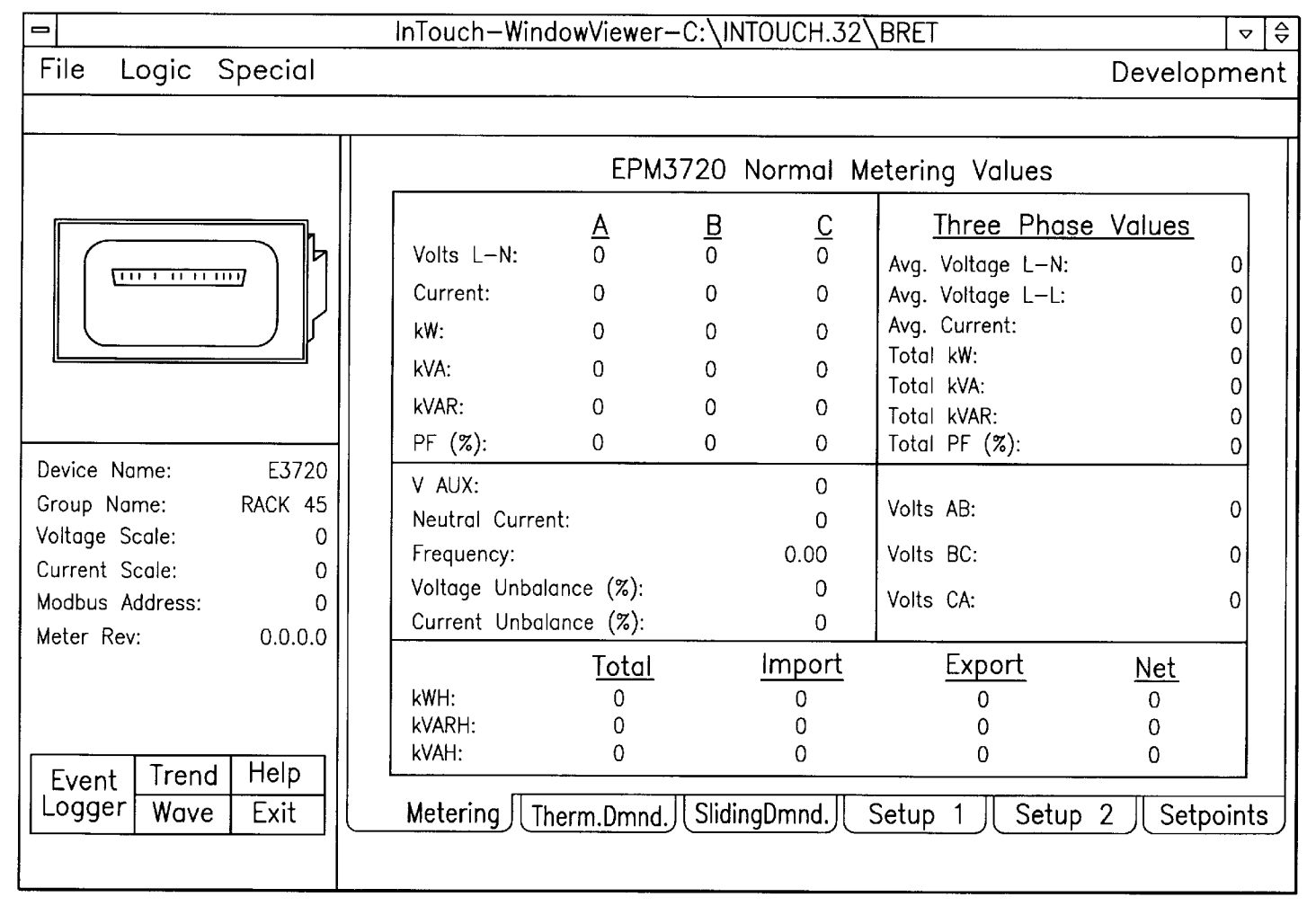

Referring to FIG. 9, an example of a Power Wizard of a metering device 28. The Power Wizards instantly develop a standard looking interface for a particular device type. These Power Wizards also create from this standard interface, unique database links that the user defines by selecting a name and entering in this name from a Power Wizard dialog box. In this way the same wizard may be used over and over again but can be logically distinguished from another via the user-defined name for a device entered in the Power Wizard dialog box. All margin for error that may have occurred in manually entering in the data access links to a database server are removed by the Power Wizards capability to set them up automatically using a unique user defined device name.

Every windows application is registered in a windows kernel with an application name. To uniquely identify a data item for communication between two cooperating (DDE aware) windows applications, the data item is identified by tuple (Application, Topic, Item). Topic name provides a grouping, and item name specifies the actual data point to be accessed under a topic. For the DDE server 40, the application name is the server's executable name. Topic name can be the device identification name and item name can be the register identification of a field data point. For example, with a General Electric Co. EPM meter, the tuple can be GE32MODB, EPM1, AMP_A where GE32MODB is the Application name for a DDE Server, EPM1 is the meter identification name, and AMP_A is the current for phase A. DDE messages mainly include requests to send data as identified by the Topic and Item name. They may also be for set point download to the data point as identified by the Topic and Item names. Input parameter values are reported by field devices on the communication interface in response to a poll by the server. This value may be a float value, an integer value, a string or discrete status bits.

Set points registers are to be downloaded based on request from a DDE client, i.e., a program, for example, such as Wonderware InTouch 5.0 or MS-Excel, which request data items from the DDE server 40 and accepts data through DDE. The DDE server acts as a link between a client requesting device data and a field device that can provide the data. The DDE server communicates to the field device through communication ports and to the client via DDE message link. A client sends its requests to the server to read/write some device registers. The server maps each request to suitable device read/write request packets and carries out the necessary transaction with the device. Then it relays the result back to the client after processing and, if necessary, casts the collected device data to the proper format. Apart from reporting contents of normal device registers, the server can also collect special data like waveform capture/recording data from the device and pass it to a client.

The DDE server 40 maintains current status (DEAD/ ACTIVE) of all active topics (devices). This information does not have any direct register associated with the device topic name and hence a pseudo item called 'STATUS' is maintained by the DDE server. If the DDE server 40 does not get a response from any device during 'n' consecutive poll cycles then that particular device is declared DEAD. The value of 'n' is read from an initialization file. The status of any device will be updated to a client only if a pre-defined item called 'STATUS' is made active. DEAD devices would be polled with period equal to a dead device scan interval (available in initialization file) instead of the device scan interval. DEAD devices will become ACTIVE when they respond to a polling request.

A device type register map must be configured for each of the device topics connected thereto. The system provides for configuration of a starting valid address, a last valid address, and a set of invalid register blocks using this utility. Valid registers, in the present example, are R0XXXX; R1XXXX; R3XXXX; or R4XXXX. Accordingly, DDE server 40 supports the following Modbus register types; R0XXXX— Discrete coils, R1XXXX—Discrete status registers, R3XXXX—Input registers, and R4XXXX—Set point registers. With these generic types, a user can configure any number of register types. Each of these types will have poll rate attributes (i.e., Fast Poll, Slow Poll, or Poll Once). Buffered events, read/write date/time registers for time synchronization, waveform capture data and waveform recording data are implemented differently in the devices which support them hence, no common configuration utility is provided for these functions. The DDE server handles each of these functions specifically. Again a mnemonic name is associated with a register address.

In general, the DDE server 40 uses the Modbus RTU protocol to communicate with a field device 13. The DDE server provides appropriate return values as specified for all clients, i.e., periodic polling packets for active topics and items, periodic polling packets for events and status, periodic update of time to all the devices, data value update to clients for acquired items, event/status report to InTouch so that it becomes part of normal alarm log, and status update for active topics (devices). Set point write requests are properly formatted set point download communication packets for the request. Execution and termination of the server are initiated on user request from the DDE server window menu.

As described hereinbefore, the Annunciator Panel Wizard assists the integrator in the development of the virtual annunciator panel display 12 of the present invention, shown in FIG. 2. Specifically, the Annunciator Panel Wizard interconnects specific device events/alarms received by the Event Logger Module 48 through the DDE server 40 to specific buttons 14 of the annunciator panel 12, and thereby provides the ability to notify the user of Alarm On/Off states of the devices throughout the PMCS 10. The annunciator panel 12 also allows the user to acknowledge alarms which are either currently on, or have previously been on and have gone to an off state.

The Annunciator Panel Wizard provides a screen full of indicator buttons 34, each relating to a particular device 13, event, or group of events. The Annunciator Panel Wizard monitors selected DDE items in the Event Logger 48 and responds to changes of state in these items by changing the colors of individual indicator buttons 34. For example, the integrator might configure a relay trip event to be associated with a button in the Annunciator Panel Wizard. The Annunciator Panel Wizard monitors a DDE tag 60 at the Event Logger 48 corresponding to the trip status of the corresponding relay 13 and displays a gray indicator if the relay is operating properly, and a red indicator if the relay has tripped.

The annunciator panel 12 includes an array of forty-eight (48) buttons 34 (six columns by eight rows). Each button 34 has an animation link, as well as 3 lines of text (definable at design time) that describe the function of each button. For example, referring to FIG. 2, the description of the second button down in the first column of buttons is "BUS-1 MAIN BREAKER TROUBLE".

Figure 12:
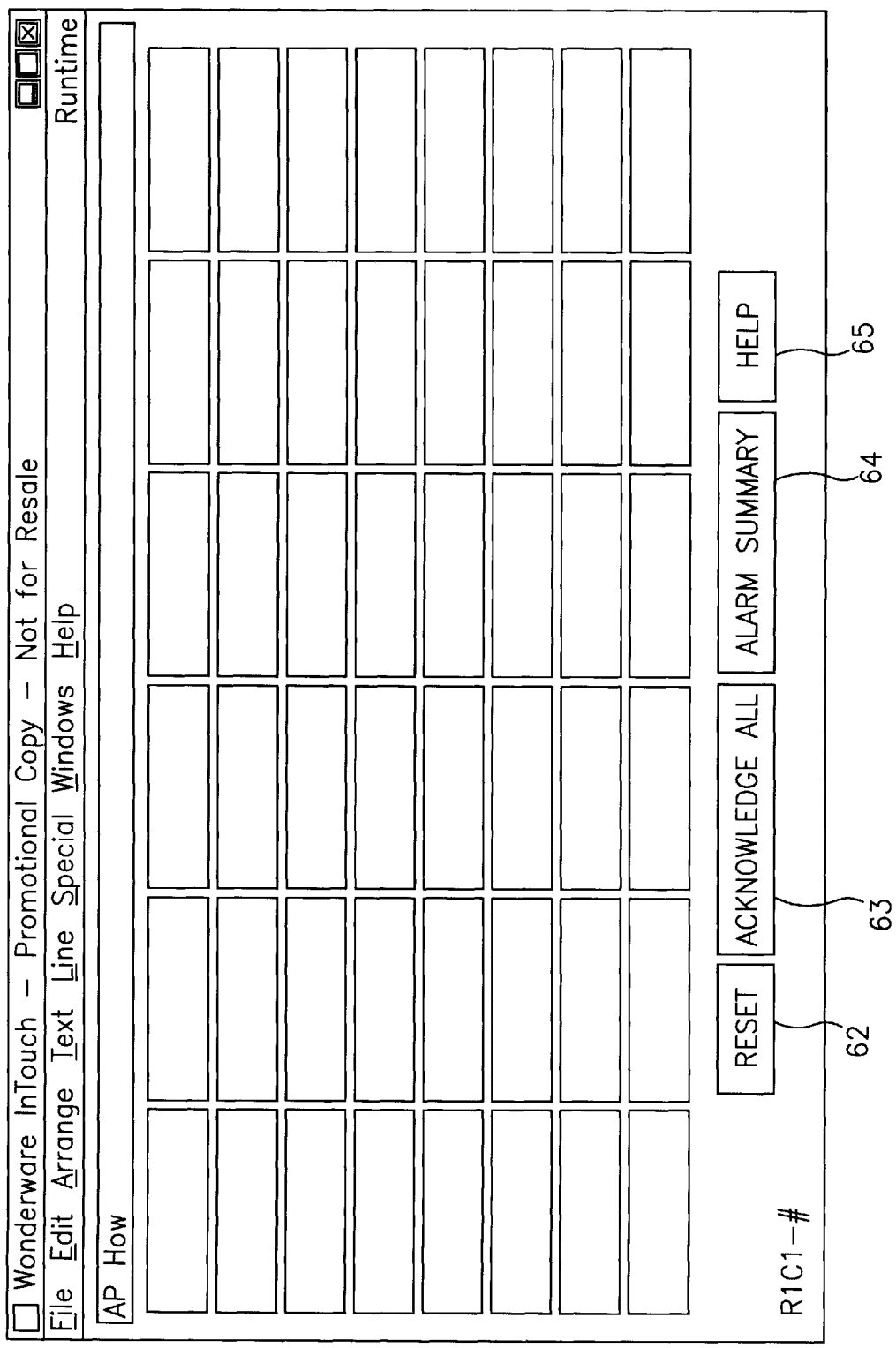
FIG. 12 is a view of an Touch—windowviewer window generated by the computer software of FIG. 3 showing a virtual annunciator panel display presented to an integrator for programming.

As shown in FIG. 12, four (4) additional buttons 62–65 are disposed below the array of buttons 34 labeled "RESET", "ACKNOWLEDGE ALL", "ALARM SUMMARY" and "HELP", respectively. The RESET button 62 allows a privileged user the ability to reset all Alarm Indicators that are currently in an Alarm–Acknowledged state. The ACKNOWLEDGE ALL button 63 cycles through all of the panel buttons 34 and acknowledges all Alarm Indicators which are in an unacknowledged state. The ALARM SUMMARY button 64 brings the local S30 Event Logger program 48 to the foreground. The HELP button 34 invokes a PMCS Help file with a context string of "Annunciator" that provides the user instructions of the features and operation of the annunciator panel 12.

Figure 10:
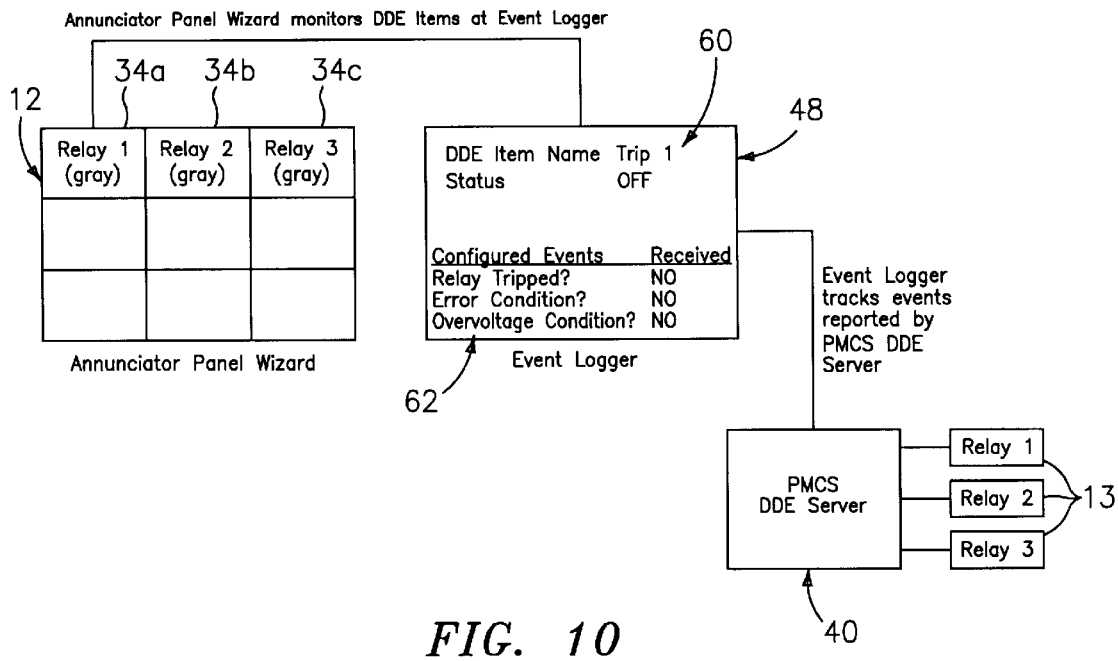
FIGS. 10 and 11 are diagrammatic block diagrams of an annunciator panel display, Event Logger and power management and control system in accordance with the present invention.
Figure 11:
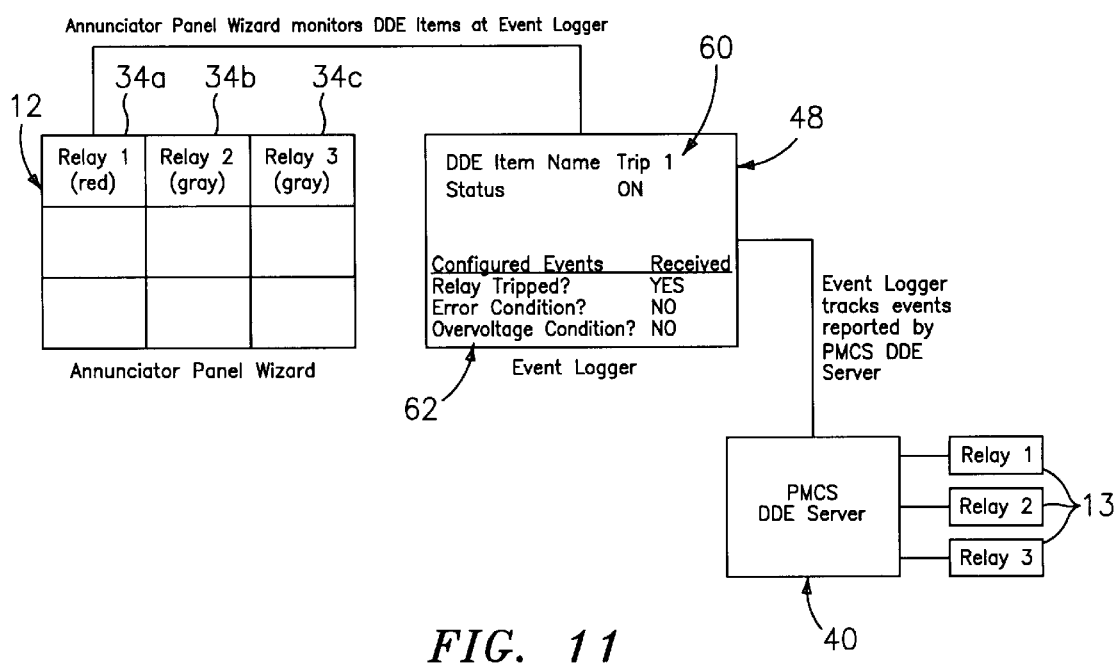

The diagrams of FIGS. 10 and 11 illustrate the relationship of the annunciator panel 12, the Event Logger 48, and the DDE Server 40 which monitors the devices 13 (e.g., Relay 1, Relay 2 and Relay 3) of the PMCS 12. The Event Logger 48 is programmed to selectively track events reported by the DDE server 40. For example, the Event Logger 48 is programmed to track three events of Relay 1. The monitored events may include the tripping of the relay 13, the occurrence of an error condition and an overvoltage condition. The Event Logger 48 is configured to change the state of the Trip 1 DDE item 60 dependent on the occurrence of any of the three monitored events.

The Annunciator Panel Wizard monitors the configured DDE items 60 at the Event Logger 48. As shown in FIG. 10, the Relay 1 button 34a monitors the DDE item Trip 1. Similarly the Relay 2 button 34b and Relay 3 button 34c of the annunciator panel 12 monitors other corresponding DDE items 60 that may be named Trip 2 and Trip 3, respectively. The Relay 1 button 34a is configured to display a gray indicator button when the status of the DDE Item Trip 1 is OFF and red when the status of the DDE Item Trip 1 is ON. In FIG. 10 none of the monitored events have occurred and therefore, the status of the DDE Item Trip 1 is OFF and the Relay 1 button 34a is gray. In FIG. 11 Relay 1 tripped and therefore, the status of the DDE Item Trip 1 is ON. In response to the ON status, the Relay 1 button 34a changes to display a red indicator button, indicative of the presence of a fault condition of Relay 1. It will be appreciated that each of the other buttons, i.e., Relay 2 button 34b and Relay 3 button 34c, operate in a similar manner for another DDE Item 60. The Event Logger Annunciator Panel Logic will also change the state of a DDE Item 60 in response to actions performed at the Annunciator Panel Wizard. The user can both acknowledge and reset individual Annunciator DDE items 60.

The wizard functionality is based on the premise that the Event Logger 48 provides new DDE "Alarm Items" which indicate the current "state" of a button of the annunciator panel 12. In the implementation of the wizard to generate an annunciator panel, the integrator configures the Event Logger Alarms Items (in the Event Logger) that track the status of a device or devices 13 of the PMCS 10. The DDE Alarm Items, therefore, are controlled by specific device events/alarms received by the event log application.

The Annunciator Panel Wizard is controlled by indirect analog tags, which the integrator associates a button 34 of the annunciator panel 12 with a corresponding Event Logger DDE Item 60. The indirect tag is used to control the color changes of each button 34, and to poke values to these DDE Items 60 (through the indirect analog tags) in order to Acknowledge and reset each Alarm Item.

The development of the virtual annunciator panel 12 includes three basic steps. First, the integrator use the Annunciator Panel Wizard to generate the annunciator panel 12 and identify each of the buttons 34 as desired. Once the wizard is configured, the integrator performs the remaining steps to complete annunciator Panel functionality in the Wonderware InTouch Application. In the InTouch Application the integrator creates InTouch DDE tags for the DDE Items 60 in the Event Logger 48 which correspond to the buttons of the annunciator panel 12 (up to 48 tags per annunciator panel). The integrator then writes a InTouch script (e.g., application startup script) that associates the InTouch indirect tags (created by the wizard) with the InTouch DDE tags created directly by the integrator.

Figure 13:
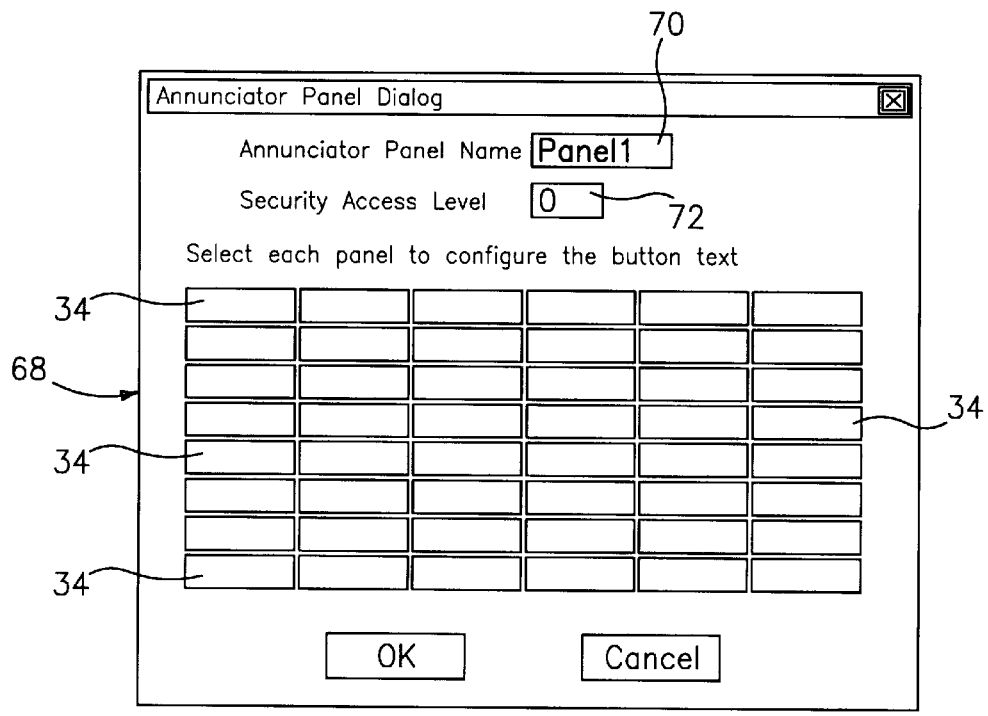
FIG. 13 is a view of a dialog box window generated by the computer software of FIG. 3 for configuring the buttons of the virtual annunciator panel display.

Referring to FIG. 12, the annunciator panel 12 is shown prior to configuring the Annunciator Panel Wizard. To configure the Annunciator Panel Wizard, the integrator drops in the wizard by selecting the Annunciator Panel Wizard from a pull down menu. Upon selection of the Annunciator Panel Wizard, a dialog box 68 is presented, as shown in FIG. 13, to the integrator with the following configuration items. First, the annunciator panel 12 is identified by entering its name in the Annunciator Panel Name field 70 (i.e., "Panel 1"). The integrator can enter up to 25 characters for this name. It is important to note that the Annunciator Panel Name is later used as a prefix for all indirect and direct tags created by the wizard. Next, the Security Access Level is entered into the corresponding field 72 of the dialog box 68. The default value is zero. The security access value defines the level of access required by the user to reset the buttons 34 (or alarms) displayed on the annunciator panel 12. The access level of each user is stored in the Wonderware $AccessLevel which enables the wizard to determine the level of access of the current user of the annunciator panel. If the user's access level is below that of the annunciator panel 12, the reset button 62 (see FIGS. 2 and 12) is disabled, prohibiting the user from resetting any of the alarms indicated on the annunciator panel.

Figure 14:
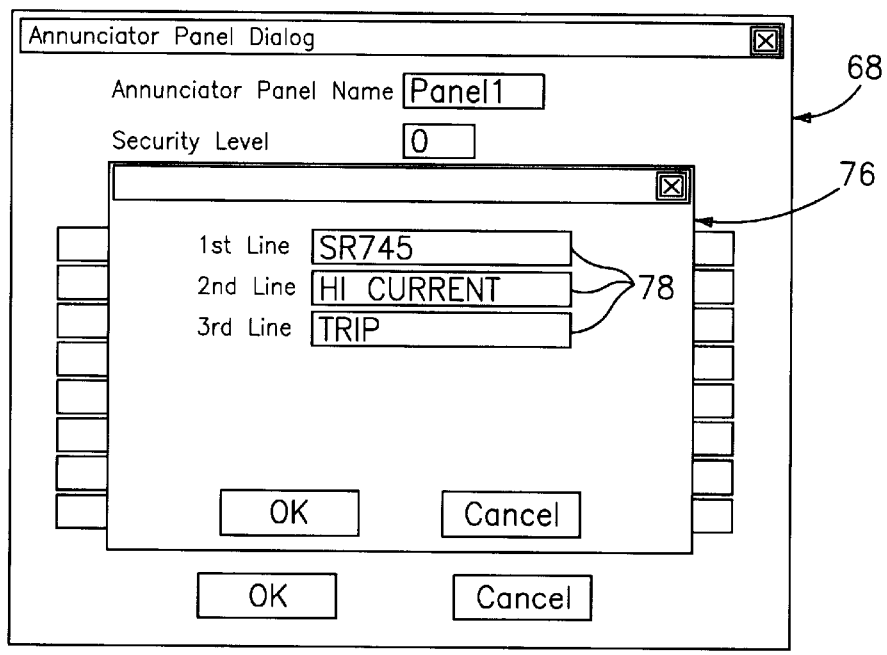
FIG. 14 is a view of a dialog box window generated by the computer software of FIG. 3 for providing a description of a button of the virtual annunciator panel display.
Figure 15:
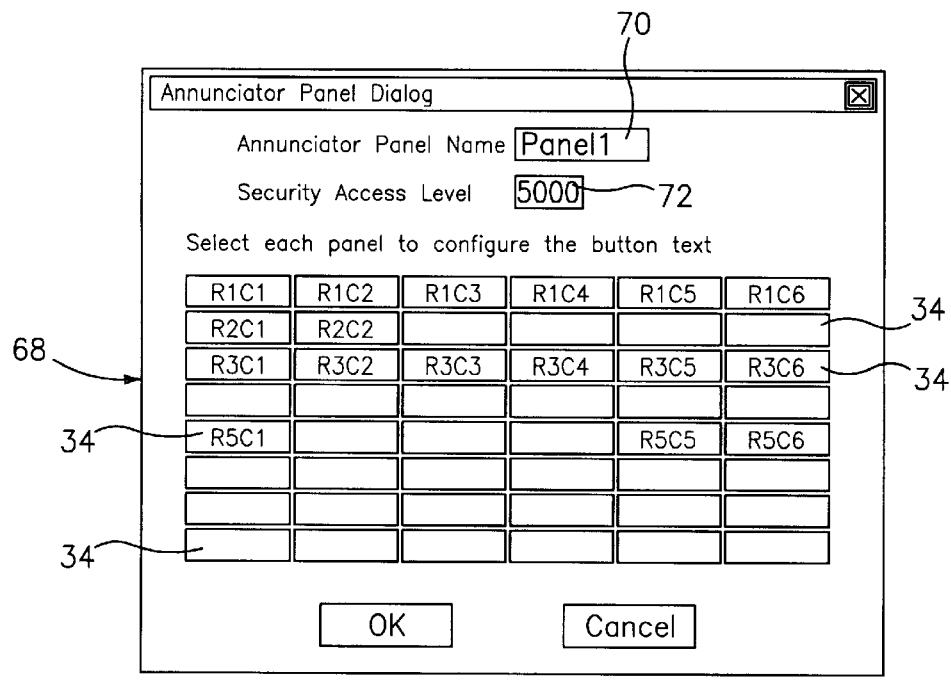
FIG. 15 is a view of a dialog box window generated by the computer software of FIG. 3 showing the configured virtual annunciator panel Display of FIG. 12.

Lastly, one of the 48 buttons 34 is selected to enable the user to configure the text on each individual button of the annunciator panel 12. Upon selecting a button by pointing and clicking on the button, a second dialog box 76, titled "Enter Description of Button", appears in the Annunciator Panel Display as shown in FIG. 14. The second dialog box 76 permits the integrator to enter three lines of text in three separate fields 78 associated with the selected button 34. After the integrator has completed entering the text, "OK" is selected to store the text for the selected button. This is repeated for each button 34 to be configured. Referring to FIG. 15, each time the integrator closes the second dialog box 76, the first dialog box 68 appears showing the integrator which panel buttons 34 have been configured via a text string (e.g. "R1C1") appearing on each configured button.

After configuring the above information (for all panels which are to be used) and selecting the "OK" button on the Annunciator Panel first dialog box 68, the wizard creates a plurality of tags, prefixed by the name entered for the annunciator panel (e.g. Panel 1), assuming that they do not already exist. A tag is a storage register that is accessible by a plurality of applications to provide a communication link therebetween. The tags created by the Annunciator Panel Wizard include 48 indirect analog tags, one for each panel button 34, that are named xxxx.R1C1 through xxxx.R8C6. Further, the Annunciator Panel Wizard includes two memory discrete tags named xxxx_Test, used to enable/disable a Test function, and xxxx_Path, used for wizard internal use. The prefix of each of the names of these tags is the name of the wizard or annunciator panel (e.g. Panel 1).

Figure 16:
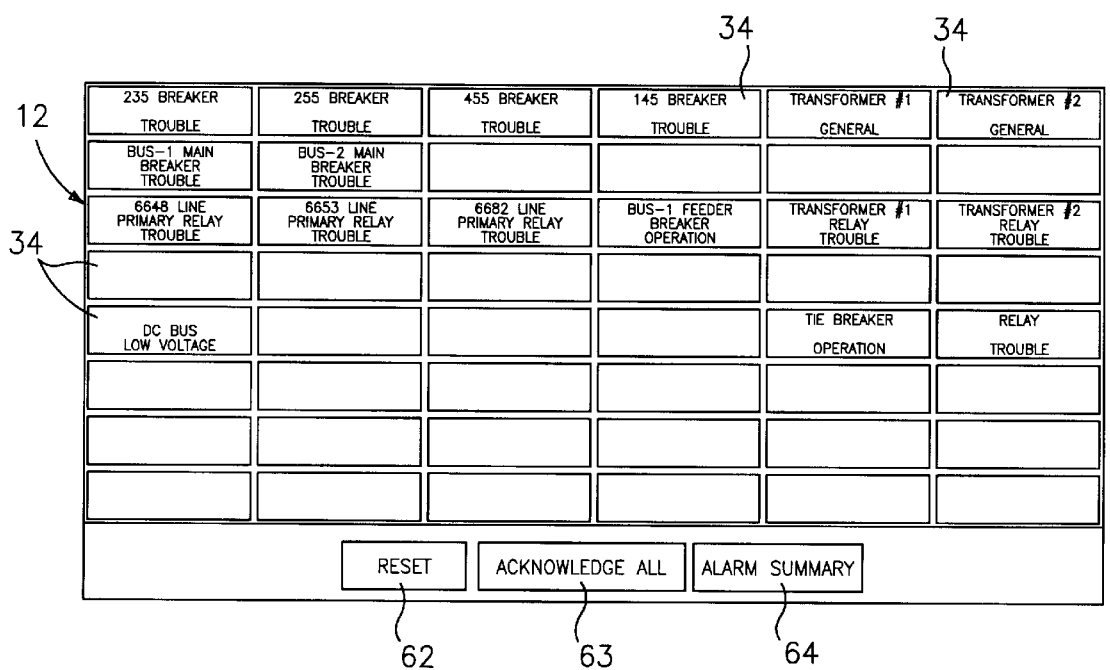
FIG. 16 is a view of an Touch—windowviewer window generated by the computer software of FIG. 3 showing the configured virtual annunciator panel display of FIG. 12.

The Annunciator Panel Wizard then displays the newly configured annunciator panel 12 as shown in FIG. 16, which is representative of the display the user will see. Each configured panel button 34 includes the text entered in the second dialog box 76 of the Annunciator Panel Wizard of FIG. 14. Each panel button 34 can have five different colors, based on the state or condition of the DDE Item 60 of the Event Logger 48 for the corresponding device 13 of the PMCS 10. A fill color animation link controlled by an indirect integer tag will be used to change colors of the buttons. For example, the fill color link of 0–9 is for the color "Dark Gray", 10–19 for "Gray", 20–29 for Gray (also including a flashing Red animation link), 30–39 for "Red" and greater than 40 for "Yellow".

A blink link or flashing Red animation link provides the Red blinking color for a fill color link of 20–29. This blink link is activated whenever the button 34 is in the Alarm Active state OR a test discrete tag is set (PanelName_Test).

When the status of a DDE Item 60 is "ON", the Event Logger 48 defines the alarm that appears to the Wonderware InTouch Application as a DDE Integer item. An alarm can be one of the following states or value: Normal (No Alarm) state; Alarm Active–Unacknowledged state; Alarm Active–Acknowledged state, Alarm Reset–Unacknowledged (Alarm occurred and automatically reset) state; and Alarm Disabled (Event Logger disable the Alarm Indicator) state. The Normal state has a DDE alarm value or tag value between 10 and 19 that represents a default color of "Solid Gray". The Alarm Active–Unacknowledged state has a tag value between 20 and 29 that represents a default color of "Blinking Red". The Alarm Active–Acknowledged state has a tag value between 30 and 39 that represents a default color of "Solid Red". The Alarm Reset–Unacknowledged state has a tag value between 40 and 49 that represents a default color of "Solid Yellow". The Alarm Disabled state has a tag value between 0 and 9 that represents a default color of "Dark Gray".

Each individual panel button 34 includes another animation link having an action script that is used to Acknowledge a button that is in an Unacknowledged state. The script will work as follows:

IF button_state .EQ. Alarm, Unacknowledged THEN
button_state=Alarm+Acknowledged
ELSEIF button_state .EQ. Alarm_Reset, Unacknowledged THEN
button_state=Alarm_Reset+Acknowledged
ENDIF The actual code of the above script for the button R1C1 is:
{If Alarm Active+Unack, then Ack}
IF AP_Test_rlc2=20 THEN
AP_Test_rlc2=23;
ELSE
{If Alarm Reset+Unack, then Ack}
IF AP_Test_rlc2=40 THEN
AP_Test_rlc2=43;
ENDIF;
ENDIF;

By changing the button_state, the indirect integer tag associated with the button 34 triggers the corresponding DDE Item 60 with which the indirect analog tag is associated. This will send a DDE Poke to the Event Logger 48 allowing the Event Logger to recognize the change in state of the alarm button or indicator 34. Each panel button 34 will only be enabled when it's corresponding Alarm is in an unacknowledged state (e.g. value=20 or value=40). After poking the Acknowledge over to the Event Logger 48, the buttons 34 will not change color until the Event Logger sends a data change value back (via DDE server), changing the button to a new state.

After the Annunciator Panel Wizard has been configured, the integrator has two steps remaining in order to get the complete annunciator panel functionality in the InTouch application. First, the integrator creates InTouch DDE tags for the DDE Items 60 in the Event Logger 48 that correspond to the Alarm panel buttons 34 of the annunciator panel 12. Second, a script is created that associates the InTouch indirect tags (created by the wizard) with the InTouch DDE tags created above. An example of this simple script is shown below:

Panel1_R1C1.Name=ALARM_1.Name;
Panel1_R1C2.Name=ALARM_52B.Name;
Panel1_R1C3.Name=XFORMER_1_ALM.Name;
Panel1_R8C4.Name=ALARM_16.Name;
Panel1_R8C5.Name=ALARM$_{25}$.Name;
Panel1_R8C6.Name=MAIN_BRKR_ALARM.Name;

The above two steps can not be automated by the Annunciator Panel Wizard without restricting the functionality of the annunciator panel 12, and due to the fact that the wizard can not create a script that is run when an application is started. Another benefit of using Indirect tags in the wizard is that one annunciator panel 12 can be used for multiple devices 13 (of the same type), and that one annunciator panel can communicate with multiple Event Loggers 48 at the same time.

From the Event Logger's perspective, there are two parts to configuring the annunciator panel 12. First, each DDE item 60 that will be displayed on the Annunciator Panel Wizard must be added at the Event Logger 48 (using the Add items dialog). Each DDE item 60 will connect to an individual button 34 in the Annunciator Panel Wizard.

The second part includes defining events 62 (see FIGS. 10 and 11) which will turn individual DDE Alarm items 60 ON or OFF. Each DDE Alarm item 60 (or annunciator panel button 34) can be turned on or off by any number of device events 62 defined by the integrator. The events 62 are logically ORed together to determine ON or OFF conditions; i.e., if any of the events occurs, the DDE item 60 in ON; if none of the events 62 have occurred, the DDE item remains OFF.

Figure 17:
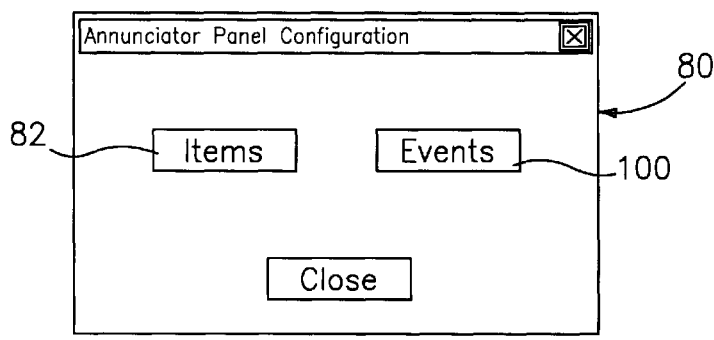
FIGS. 17–21 are views of an InTouch dialog boxes for configuring the Event Logger to enable interface with the annunciator panel display of FIG. 2.

To configure the annunciator panel items in the Event Logger 48, the integrator displays the Annunciator Panel Configuration dialog box 80 as shown in FIG. 17. The selection of the ITEMS button 82 opens the Annunciator Panel Item window 84 shown in FIG. 18 which permits the integrator to configure particular DDE Items 60 to be available to other applications. The Annunciator Panel Items window 84 displays all the existing DDE Items 60 available to the annunciator panel buttons 34. A Panel Item 86 may be deleted from the Existing Item List 88 by highlighting the Panel Item and selecting the DELETE button 90. At a confirmation dialog box (not shown), the OK button is selected to delete the Panel Item 86.

Figure 19:
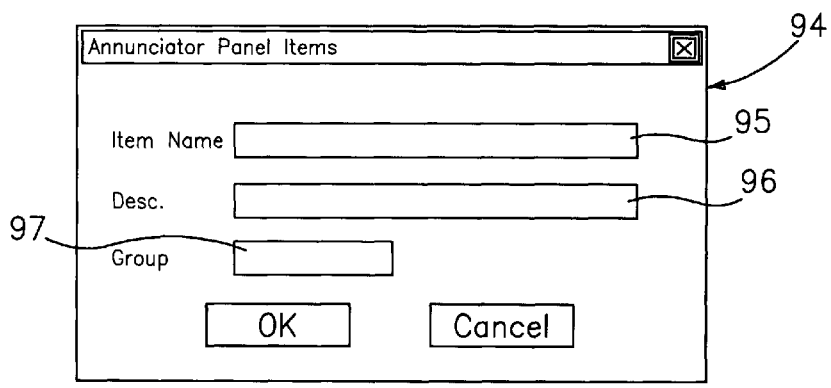

A Panel Item 86 may be added to the Existing Item List 88 by selecting the ADD button 92 which displays the Annunciator Panel Items Add window 94, shown in FIG. 19.

The integrator then enters an Item Name, Description and Group for this item in the respective fields 95–97. The Item name 95 of these entries are used when writing the script that associates the InTouch indirect tags with the InTouch DDE tags created in the Event Logger 48, as described hereinabove.

Figure 18:
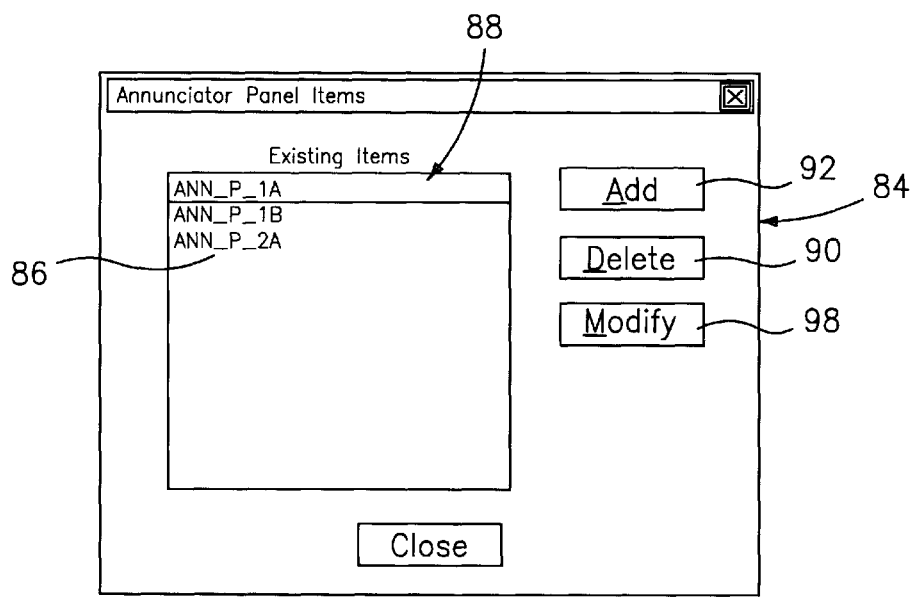

To modify an existing DDE Item 60, the DDE Item in the Annunciator Panel Items window 84 of FIG. 18 is highlighted and the Modify button 98 of is selected which displays the Annunciator Panel items Add window 94 of FIG. 19. The integrator then makes any changes to the Item Name, Description or Group fields 95–97 and clicks OK.

Figure 20:
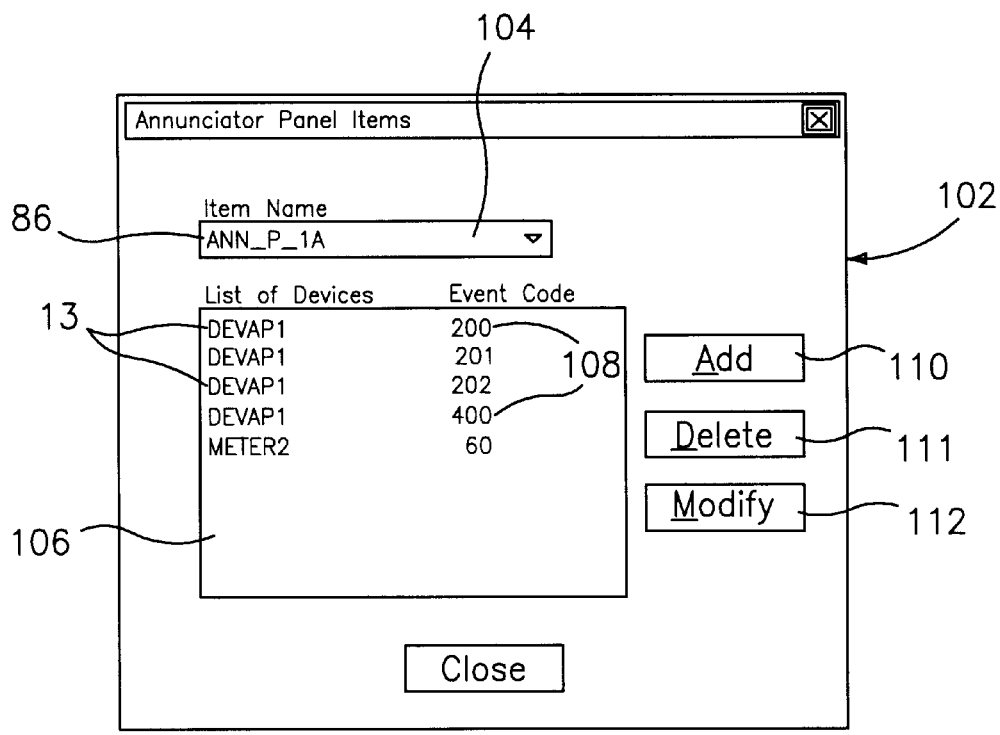
Figure 21:
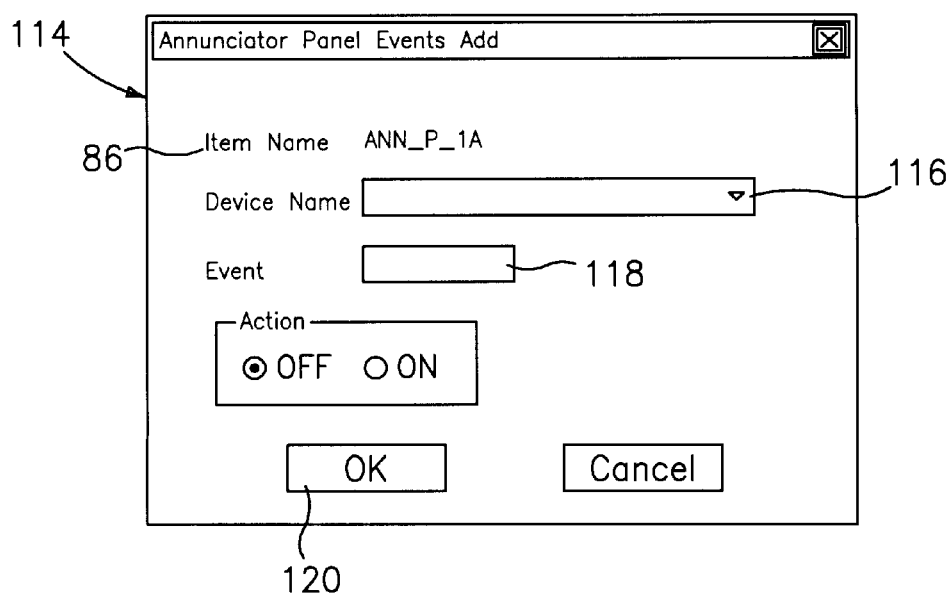

Referring back to the Annunciator Panel Configuration window 80 of FIG. 17, the integrator select the Events button 100 to configure or modify the events 62 associated with an existing Annunciator Panel Item 86. Selecting of the Events button 100 displays the Annunciator Panel Events dialog box 102 of FIG. 20. The Panel Item 86 to be configured is selected from the pull down menu in the Item Name field 104. A second field 106 then displays the list of devices 13 and corresponding event codes 108 for each of the selected devices. The integrator may change the devices and event codes listed for the Panel Item 86 by selecting one of the Add, Delete and Modify buttons 110–112, respectively. A device may be deleted from the list by highlighting the device 13 and selecting the Delete button 111. A device 13 may be added by selecting the Add button 110 that displays the Annunciator Panel Events Add dialog box 114 shown in FIG. 21. In the Annunciator Panel Events Add dialog box 114, the Item Name 86 shows the currently selected DDE Item 60. The integrator selects a device 13 from the Device Name pull-down menu 116 and then enters an event code 108 in the Event field 118 that the Event Logger 48 monitors. In the Action filed, the integrator selects whether this event will cause an "ON" or "OFF" condition of this DDE Item 60. The "OK" button 120 is selected to close the dialog box 114 and save the Panel Event 86 to the DDE Item 60.

As described hereinbefore, if any of the event code 108 of the device selected for a DDE Item 60 is detected, the annunciator panel button 34 associated with the DDE Item, through the indirect tags, changes the color of the panel button 34 in accordance with the type of fault detected.

While preferred embodiments have been shown and described, various modifications and substitutions may be made thereto without departing from the spirit and scope of the invention. Accordingly, it is to be understood that the present invention has been described by way of illustrations and not limitation.

What is claimed is:

1. A method of generating a user configurable annunciator panel display having at least one indicator for monitoring a device of a power control system; said method comprising:

selecting an annunciator panel wizard from a menu;

selecting an indicator from an array of available indicators within the annunciator panel by choosing an indicator to be newly defined or re-defined;

defining a monitored device to be associated with the selected indicator by using the annunciator panel wizard;

providing an event logger for monitoring events of a monitored device of the power control system;

providing a navigational link between said selected indicator and said event logger wherein the navigational link includes a memory register commonly addressable by said selected indicator and said event logger;

providing a script to associate said memory register and said event logger; and assigning a visual display to said selected indicator indicative of the occurrence of said monitored event.

2. The method of claim 1 further comprising accessing an annunciator panel wizard dialog box and assigning a name to the annunciator panel display.

3. The method of claim 1 further comprising accessing an annunciator panel wizard dialog box and assigning a description to said selected indicator.

4. The method of claim 1 further comprising assigning a security access level value to the annunciator panel display, whereby a user assigned a security access level of at least said panel security access level value may reset a condition of said selected indicator.

5. The method of claim 1 further comprising providing a reset button within said annunciator panel display for resetting said selected indicator having an alarm state.

6. The method of claim 1 further comprising providing an acknowledge button within said annunciator panel display for acknowledging said selected indicator having an unacknowledged alarm state.

7. The method of claim 1 further comprising providing an alarm summary button within said annunciator panel display for bringing the event logger to the foreground.

8. The method of claim 1 further comprising providing a help button within said annunciator panel display for invoking a help file that provides a user instructions of the features and operation of the annunciator panel wizard.

9. The method of claim 1 wherein said navigational link further includes a second memory register associated with said event logger.

10. The method of claim 1 further comprising selecting an event logger wizard for selecting the monitored device.

11. The method of claim 1 wherein said providing an event logger further comprises:

selecting a device to be monitored by the power control system;

selecting a monitored event associated with said selected device; and identifying the status of the selected device that indicates a fault condition.

12. The method of claim 1 wherein assigning a visual display includes assigning a color to said indicator indicative of the occurrence of said monitored event.

13. The method of claim 1 further comprising selecting said indicator to reset an alarm indication.

14. The method of claim 13 further comprising providing a script to assign a visual display in response to data provided by said event logger.

15. The method of claim 1 further comprising selecting said indicator to acknowledge an unacknowledged alarm.

* * * * *